Nov. 12, 1946.                W. A. EATON                2,410,967
                    FLUID PRESSURE CONTROL MECHANISM
                          Filed Feb. 5, 1945
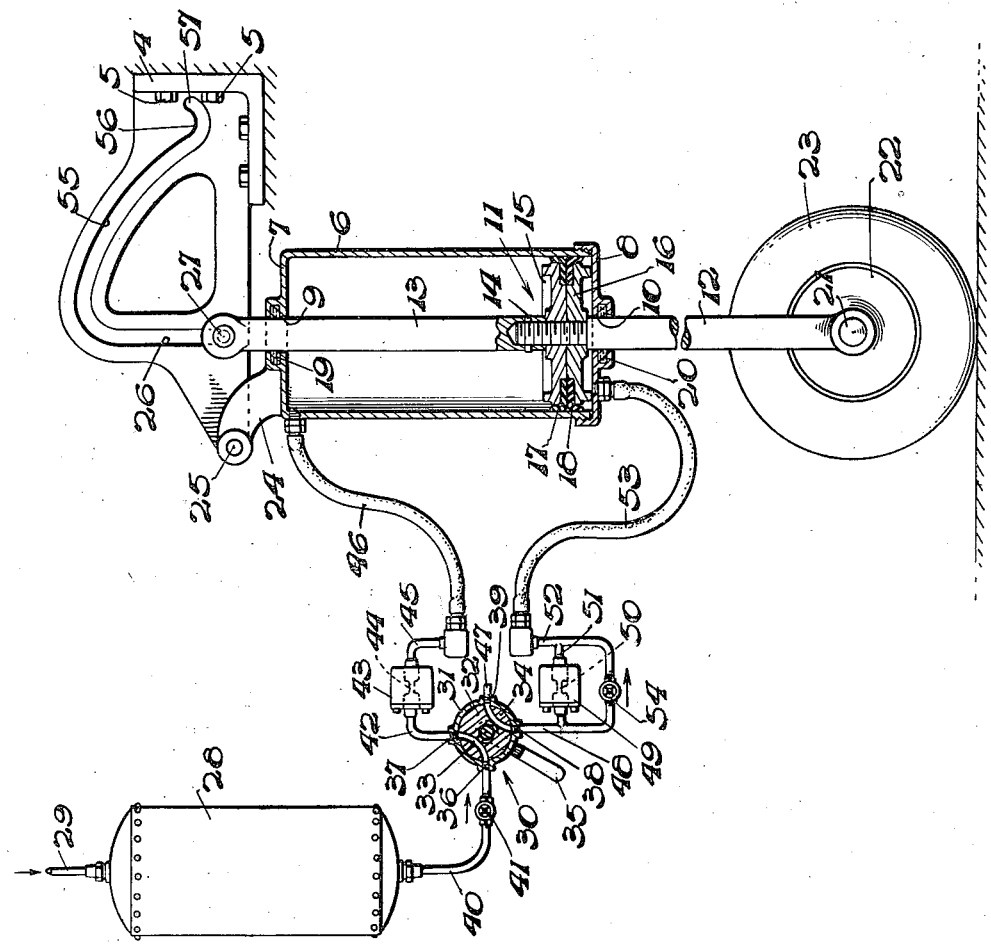
INVENTOR.
Wilfred A. Eaton
BY
Scrivener + Parker
ATTORNEYS Patented Nov. 12, 1946

2,410,967

UNITED STATES PATENT OFFICE 2,410,967

FLUID PRESSURE CONTROL MECHANISM

Wilfred A. Eaton, Elyria, Ohio, assignor to Bendix-Westinghouse Automotive Air Brake Company, Elyria, Ohio, a corporation of Delaware Application February 5, 1945, Serial No. 576,247

9 Claims. (Cl. 244—102)

1

This invention relates to fluid pressure control mechanism, and more particularly to combined shock absorbing and retractible landing gear mechanism controlled and operated by fluid pressure for use on a vehicle such as an airplane.

Numerous mechanisms have previously been proposed for this purpose, but in many cases they have required the use of a separate fluid actuator for retracting the landing gear, and it is therefore an object of the present invention to provide mechanism so constituted as to eliminate the necessity for providing a separate actuator for this purpose.

Another object of the invention is to provide means for maintaining the landing wheel or ground engaging device in longitudinal alignment with the vehicle.

A further object of the invention is to provide landing gear mechanism including a single fluid pressure actuator for absorbing shocks and for extending and retracting the ground engaging device with respect to the vehicle.

A still further object of the invention is to provide simple and efficient means for automatically locking the landing gear in retracted position.

Another object of the invention is to provide an operator controlled means for controlling the operation of a combined shock absorber and a retractible landing gear of the above type.

These and other objects and novel features of the invention will become more readily apparent when considered in connection with the following description and the accompanying drawing. It is to be understood, however, that the invention is not limited thereby, reference being had to the appended claims for a definition of the limits of the invention.

Referring now to the single figure of the drawing, illustrating diagrammatically a combined shock absorber and landing gear of the above type, a vehicle, or airplane, not shown, is provided with a bracket member 4 suitably attached to the frame work of the vehicle as by means of bolts 5. A cylinder 6 is closed at its upper end by means of an end plate 7, and at its lower end by means of a cover plate 8 threadedly attached to the lower end of the cylinder, the end plate 7 being provided with a bore 9 concentric with the cylinder, and the cover plate 8 being provided with a similarly located bore 10. A piston and rod assembly 11 is slidably mounted in the cylinder, this assembly comprising a lower piston rod 12 slidably mounted in the bore 10 and an upper piston rod 13 slidably mounted in the bore 9 and adapted to threadedly receive the upper end of the rod

2

12, relative rotation of the rods 12 and 13 being prevented after assembly by means of a suitable pin 14. The piston portion of the assembly comprises followers 15 and 16 clamped between the rods 12 and 13, leakage by the piston being prevented by means of a pair of oppositely disposed piston cups 17 and 18 clamped between the follower plates as shown. A seal 19 is provided in the bore 9 to prevent leakage past the upper piston rod, and a similar seal 20 is positioned in the bore 10 to prevent leakage from the cylinder by the lower piston rod. The lower end of the rod 12 is rigidly attached by any suitable means to an axle 21, a ground engaging device or wheel 22 being rotatably mounted thereon and provided with a tire 23.

The landing gear and shock absorber mechanism is shown in extending position with respect to the vehicle, and the cylinder is provided at its upper end with a bracket portion 24 pivotally connected with the bracket 4 by means of a pivot pin 25, this mounting serving to permit rotation of the cylinder about the pivot pin and to prevent rotation thereof in any other direction. In order to further position the cylinder and piston assembly 11 with respect to the frame work of the vehicle, the bracket 4 is provided with a guide track 26 arranged substantially vertical with respect to the vehicle, and a suitable pin 27 which may be rigidly attached to the upper end of the piston rod 13, serves to engage the guide track 26 in order to insure vertical movement of the piston rod 13 while the pin 27 is in engagement with the guide track 26, and at the same time to prevent rotation of the rod 13 about its axis. Since the rod 13 is prevented from rotation with respect to the piston rod 12 by means of pin 14, the cooperation of the pin 27 with the guide track 26 also serves to prevent rotation of the entire piston assembly 11 with respect to the vehicle, and therefore maintains the wheel 22 in alignment longitudinally with the vehicle at all times.

A fluid pressure reservoir 28 is provided on the vehicle, and may be supplied with fluid under pressure, such as compressed air, for example through a conduit 29 connected with a compressor, not shown. A control valve 30 is provided for controlling the flow of fluid pressure to and from either end of the cylinder 6, this control valve comprising a casing 31 suitably attached to the vehicle, and a rotating valve plug 32 provided with ports 33 and 34, as well as an operating lever 35. With the parts in the position shown, ports 36 and 37 provided in the casing 31 are connected by means of a passage 33, and ports 38 and 39 in the casing are connected by means of passage 34. The reservoir 28 is connected with port 36 by means of a conduit 40 and a one-way check valve 41 interposed therein, while the port 37 is connected with the upper end of the cylinder 6 by means of a conduit 42, a choke device 43 having a restricted passage 44, a conduit 45, and a flexible hose 46. The port 39 is connected with atmosphere by means of an exhaust conduit 47, and the port 38 is connected with the lower end of the cylinder 6 by means of a conduit 48, a choke device 49 having a restricted passage 50, a conduit 51, conduit 52, and a flexible hose 53. Thus with the valve plug 32 in the position shown, fluid pressure is free to flow from the reservoir 28 to the upper end of the cylinder through the passages above described, while the lower end of the cylinder is connected with atmosphere. On rotation of the valve plug 32 in a clockwise direction, the passage 33 is brought in to register with the ports 37 and 39 to connect the upper end of the cylinder 6 with atmosphere, and the passage 34 is brought in to register with the ports 36 and 38 in order to permit the flow of fluid pressure from the reservoir to the lower end of the cylinder through the passages above described.

Assuming that the above mechanism is installed on an airplane, the parts are shown in extended position, and on engagement of the tire 23 with the ground, the piston assembly will be forced upward against the cushion of fluid in the upper end of the cylinder, and compression of this fluid into the reservoir 28 will be prevented by the one-way check valve 41. During normal upward movement of the wheel and piston assembly due to landing shock, the device is so designed as to absorb the entire shock during movement of the pin 27 in the vertical guide track 26, thus insuring substantially vertical movement of the piston assembly and wheel with respect to the vehicle during shock absorbing action of the device. As the piston assembly moves upward, atmospheric air will be drawn into the lower end of the cylinder through the flexible hose 53, the conduit 52, the conduit 51, the restricted passage 50 in the choke 49, conduit 48, port 38, passage 34, port 39 and exhaust conduit 47. After the shock has been absorbed as above stated, the pressure in the upper end of the cylinder will tend to move the piston assembly downward again, and the air which was drawn into the lower end of the cylinder, as above described, will be discharged to atmosphere through the passages named, the restriction imposed by the passage 50 intending to control the speed of this action in order to control the rebound of the vehicle. In order to insure a full charge of air being drawn into the lower end of the cylinder during upward movement of the piston assembly, the lower ends of the conduits 48 and 52 are connected as shown by means of a one-way check valve 54, thus insuring a sufficient supply of air in the lower end of the cylinder to effect a satisfactory control of the rebound. The restricted passage 50 also serves to limit the speed with which the landing gear may be extended when fluid is supplied from the reservoir to the upper end of the cylinder, and at the same time the rate of flow of fluid to the upper end of the cylinder may be controlled as desired by varying the size of the restricted supply passage 44. During retraction of the landing gear, the passage 44 also limits the speed of retraction of the landing gear to any desired value.

On movement of the control valve lever 35 to operate the valve to supply fluid from the reservoir to the lower end of the piston and to exhaust fluid from the upper end of the cylinder in order to retract the landing wheel toward the cylinder, it is also desirable that the landing wheel, as well as the piston rod and cylinder, be retracted into the interior of the vehicle frame, or into a substantially horizontal position in order to minimize wind resistance during flight, and to this end, a curved guide track 55, coextensive with the guide track 26 is provided in the bracket 4 and extends downwardly at its right end as shown. On upward movement of the piston assembly in response to the application of fluid pressure to the lower end of the cylinder, the pin 27 is moved upward along the guide track 26, and as it engages the left end of the curved guide track 55, the pin is cammed to the right, thus forcing the cylinder to rotate in a clockwise direction about the pivot pin 25. As this movement continues, the pin eventually moves to the lower end of the guide track 55, at which point the cylinder and piston rod are substantially horizontal with the vehicle, depending on the exact shape and positioning of the guide track with respect to the position of the pivot pin 25. On operation of the control valve 30 to supply fluid from the reservoir to the upper end of the cylinder to extend the landing gear, the reverse action takes place, and the pin 27 moves along the guide track 55 until it reaches the vertical guide track 26, whereupon it is moved directly downward to the position shown. It is also desirable to provide means for maintaining the landing gear in retracted position in the event of failure of the fluid pressure supply, and the bracket 4 is therefore provided with a third guide track 56, coextensive with the track 55, and having an upwardly extending notch 57 at the right end thereof. As the pin 27 reaches the right end of the track 55 during retracting operation of the mechanism, it will be apparent that further upward movement of the piston with respect to the cylinder will force the pin 27 into the notch 57. In this event, the entire landing gear will have been rotated in a clockwise direction with respect to the pivot pin 25, and the weight of this mechanism will therefore tend to force the pin 27 upward into the notch 57. In the event of failure of the supply of fluid pressure to the lower end of the piston, the weight of the parts will still maintain the pin 27 in engagement with the notch, and extension of the landing gear can only be accomplished by supplying fluid pressure to the upper end of the cylinder to move the piston assembly in the other direction. When this occurs, the pin 27 will be withdrawn from the notch 57, and will thereafter move along the guide track to the position shown.

It will thus be apparent from the foregoing that means have been provided whereby a single fluid actuator serves to retract or extend the landing gear of a vehicle, and at the same time serves as a shock absorber, these functions being under the control of the vehicle operator. At the same time, means have been provided for automatically insuring substantially vertical movement of the landing wheel during the shock absorbing action and retracting movement of the entire mechanism during the balance of the stroke. At the same time, the mechanism serves to automatically lock the landing gear in retracted position in the event of failure of the fluid pressure supply, and serves to maintain the landing wheel in alignment with the vehicle at all times, without requiring the use of additional parts or mechanisms for this purpose.

While one form of the invention has been illustrated and described in considerable detail, it will be understood by those skilled in the art that changes and modifications may be made without departing in any way with the spirit of the invention. Reference will, therefore, be had to the appended claims for a definition of the limits of the invention.

What is claimed is:

1. A combined shock absorbing and retractible landing gear for a vehicle including a ground engaging device, a double acting fluid actuator including a casing member and a pressure responsive member movably mounted therein, means for connecting one of said members with said device, a source of fluid pressure, valve means for selectively controlling the flow of fluid pressure from the source to either end of the casing member and for controlling the exhaust of fluid pressure therefrom, and means for positioning said members and ground engaging device with respect to the vehicle including a pivotal connection between the other of said members and the vehicle, a guide on the vehicle spaced from said pivotal connection having a substantially straight portion and a curved portion, and means carried by the other of said members for engaging the guide, whereby said members are positioned substantially vertical with respect to the vehicle during movement of the pressure responsive member in the casing during one portion of its travel and are moved to a substantially horizontal position with respect to the vehicle on movement of the pressure responsive member through the rest of its travel.

2. A combined shock absorber and retractible landing gear for a vehicle including a ground engaging device, a double acting fluid actuator including a casing member and a pressure responsive member slidably guided thereby, means for connecting one of said members with said device, a source of compressed fluid, valve means for selectively controlling the flow of fluid pressure from the source to either end of the casing member and for controlling the exhaust of fluid pressure therefrom for effecting relative movement of the members in either direction, and means for positioning and guiding said members for effecting substantially vertical movement of the device with respect to the vehicle during one portion of the relative travel of said members and movement of said members to a substantially horizontal position with respect to the vehicle on movement of said members through the balance of said travel including a pivotal connection between the other of said members and said vehicle, a guide track on the vehicle having a substantially straight vertical portion and a curved portion coextensive therewith, and means engaging said guide track and connected with said one member.

3. A combined shock absorber and retractible landing gear for a vehicle including a ground engaging device, a double acting fluid actuator including a casing member and a pressure responsive member slidably guided thereby, means for connecting one of said members with said device, a source of compressed fluid, valve means for selectively controlling the flow of fluid pressure from the source to either end of the casing member and for controlling the exhaust of fluid pressure therefrom for effecting relative movement of the members in either direction, means for positioning and guiding said members for effecting substantially vertical movement of said device with respect to the vehicle during one portion of the relative travel of said members including a pivotal connection between the other member and vehicle, a relatively straight vertical guide track on the vehicle, means engaging said guide track and connected with said one member, and means for guiding said members to a substantially horizontal position relative to the vehicle on movement of the members through the remainder of said relative travel including a curved guide track coextensive with the first named track.

4. A combined shock absorber and retractible landing gear for a vehicle including a ground engaging device, a double acting fluid actuator including a casing member and a pressure responsive member slidably guided thereby, means for connecting one of said members with said device, a source of compressed fluid, valve means for selectively controlling the flow of fluid pressure from the source to either end of the casing member and for controlling the exhaust of fluid pressure therefrom for effecting relative movement of the members in either direction, means for positioning and guiding said members for effecting substantially vertical movement of said device with respect to the vehicle during one portion of the relative travel of said members in one direction including a pivotal connection between said other member and vehicle, a relatively straight vertical guide track on the vehicle, means engaging said guide track and connected with said one member, a curved guide track coextensive with the first named guide track adapted to receive said engaging means for guiding said members into a substantially horizontal position on the vehicle during further relative movement of said members, and a third guide track coextensive with the second named guide and engageable by said engaging means to maintain said members in said substantially horizontal position except on operation of said valve means to supply fluid pressure to said casing to effect relative movement of said members in the opposite direction.

5. A combined shock absorber and retractible landing gear for a vehicle including a ground engaging device, a double acting fluid actuator including a casing member and a pressure responsive member slidably guided thereby, means for connecting one of said members with said device, a source of compressed fluid, valve means for selectively controlling the flow of fluid pressure from the source to either end of the casing member and for controlling the exhaust of fluid pressure therefrom for effecting relative movement of the members in either direction, and means for preventing relative rotation of said members and guiding said members for effecting substantially vertical movement of the device relative to the vehicle during a portion of the relative travel of said members and for guiding said members into a substantially horizontal position on the vehicle during the balance of said travel including a pivotal connection between said other member and vehicle, a guide track on the vehicle having a substantially straight vertical portion and a curved portion coextensive therewith, and guide means slidably mounted in said guide track and connected with said one member.

6. A combined shock absorbing and retractible landing gear for a vehicle including a ground engaging device, a double acting fluid actuator including a cylinder and a piston slidably mounted therein, a piston rod having a connection with the device, a source of compressed fluid, valve means operable in one position to connect the source with one end of the cylinder and to exhaust fluid from the other end to effect movement of the device away from the cylinder and operable in another position to connect the source with said other end of the cylinder and to exhaust fluid from said one end to retract the device toward the cylinder, and means for guiding the movement of said cylinder, piston rod and device including a pivotal connection between the cylinder and vehicle, a guide track on the vehicle having a substantially straight vertical portion and a curved portion coextensive therewith, and a guide member in engagement with said track and connected to said piston rod, whereby the piston rod moves in a direction substantially vertical to the vehicle during one portion of the travel of the piston in the cylinder and the piston rod and cylinder are moved into a substantially horizontal position on the vehicle on movement of the piston through the balance of its travel.

7. A combined shock absorbing and retractible landing gear for a vehicle including a ground engaging device, a double acting fluid actuator including a cylinder and a piston slidably mounted therein, a piston rod having a connection with the device, a source of compressed fluid, valve means operable in one position to connect the source with one end of the cylinder and to exhaust fluid from the other end to effect movement of the device away from the cylinder and operable in another position to connect the source with said other end of the cylinder and to exhaust fluid from said one end to retract the device toward the cylinder, and means for guiding the movement of said cylinder, piston rod and device for maintaining alignment of said device longitudinally of the vehicle and for maintaining the device in retracted position in the event of failure of the supply of fluid pressure to said other end of said cylinder including a pivotal connection between the cylinder and vehicle, a guide track on the vehicle having a substantially vertical portion, a curved portion coextensive with the vertical portion, and an upwardly extending notch portion coextensive with said curved portion, and guide means connected to said piston rod positioned in engagement with said guide track and adapted to engage said notch portion thereof when the device is fully retracted toward the cylinder.

8. A combined shock absorbing and retractible landing gear for a vehicle including a ground engaging device, a double acting fluid actuator including a cylinder having a cylinder head on either end provided with a bore substantially concentric with the cylinder, a piston slidably mounted in said cylinder, a piston rod attached to the piston and slidably mounted in said bores and extending therethrough at either end of the cylinder, a ground engaging device attached to one end of the piston rod, a source of compressed fluid, valvular means operable in one position to supply compressed fluid from the source to one end of the cylinder and to exhaust fluid from the other end whereby the piston and piston rod are moved to extend the device from the cylinder and operable in another position to supply compressed fluid to the other end of the cylinder and to exhaust fluid from said one end whereby the device is retracted toward the cylinder, and means for insuring substantially vertical movement of the rod and device during one portion of said retracting movement and movement of said rod and cylinder into a substantially horizontal position when the device is fully retracted toward the cylinder including a pivotal connection between the cylinder and vehicle, a guide track on the vehicle having a substantially vertical portion and a curved portion coextensive therewith, a guide member slidably mounted in said guide track, and a connection between said guide member and the other end of said piston rod.

9. A combined shock absorbing and retractible landing gear for a vehicle including a ground engaging device, a double acting fluid actuator including a cylinder having a cylinder head on either end provided with a bore substantially concentric with the cylinder, a piston slidably mounted in said cylinder, a piston rod attached to the piston and slidably mounted in said bores and extending therethrough at either end of the cylinder, a ground engaging device attached to one end of the piston rod, a source of compressed fluid, valvular means operable in one position to supply compressed fluid from the source to one end of the cylinder and to exhaust fluid from the other end whereby the piston and piston rod are moved to extend the device from the cylinder and operable in another position to supply compressed fluid to the other end of the cylinder and to exhaust fluid from said one end whereby the device is retracted toward the cylinder, and means for preventing rotation of said piston rod in said bores and for insuring substantially vertical movement of said rod and device during one portion of said retracting movement and movement of said rod and cylinder into a substantially horizontal position when the device is fully retracted toward the cylinder including a pivotal connection between the cylinder and vehicle, a guide track on the vehicle having a substantially vertical portion and a curved portion coextensive therewith, a guide member slidably mounted in said track, and a connection between the other end of said piston rod and guide member for insuring movement of said other end of the rod with the guide member and for preventing rotation of the rod in said cylinder head bores, whereby said device is maintained in alignment longitudinally of the vehicle.

WILFRED A. EATON.